United States Patent [19]

Anton et al.

[11] Patent Number: 5,013,121

[45] Date of Patent: May 7, 1991

[54] OPTICAL FIBER STORAGE CONTAINER

[76] Inventors: Mark A. Anton, 5521 Cumberland Rd., Minneapolis, Minn. 55410; Wayne A. Johnson, 16280 Galena Ave., Rosemount, Minn. 55068

[21] Appl. No.: 374,008

[22] Filed: Jun. 29, 1989

[51] Int. Cl.⁵ .............................................. G02B 6/36
[52] U.S. Cl. ................................................. 350/96.20
[58] Field of Search ..................................... 350/96.20

[56] References Cited

U.S. PATENT DOCUMENTS

| | | | |
|---|---|---|---|
| 4,585,303 | 4/1986 | Pinsard et al. | 350/96.20 |
| 4,630,886 | 12/1986 | Lauriello et al. | 350/96.20 |
| 4,702,551 | 10/1987 | Coulombe | 350/96.20 |
| 4,717,231 | 1/1988 | Dewez et al. | 350/96.20 |
| 4,722,585 | 2/1988 | Boyer | 350/96.20 |
| 4,752,110 | 6/1988 | Blanchet et al. | 350/96.20 |
| 4,765,708 | 8/1988 | Becker et al. | 350/96.20 |
| 4,765,709 | 8/1988 | Suillerot et al. | 350/96.20 |
| 4,792,203 | 12/1988 | Nelson et al. | 350/96.20 |
| 4,798,432 | 1/1989 | Becker et al. | 350/96.20 |
| 4,818,054 | 4/1989 | George et al. | 350/96.20 |
| 4,840,449 | 6/1989 | Ghandeharizadeh | 350/96.20 |

*Primary Examiner*—John D. Lee
*Assistant Examiner*—Phan T. Heartney
*Attorney, Agent, or Firm*—Merchant, Gould, Smith, Edell, Welter & Schmidt

[57] ABSTRACT

An optical fiber storage apparatus is disclosed having a tray and a take-up spool rotatably mounted on the tray. The spool includes upper and lower disk portions separated by a plurality of columns. Opposing surfaces of the columns define an outer circumferential track and an interior track disposed within said outer track and in communication therewith. Axial openings are formed through at least one of the plates to provide exposure of the tracks for insertion of a cable within the tracks and surrounding the outer circumferential track.

6 Claims, 5 Drawing Sheets

OPTICAL FIBER STORAGE CONTAINER

BACKGROUND OF THE INVENTION

1. Field of the Invention

This invention pertains to a communication system in which signals are carried through an optical fiber. More particularly, this invention pertains to a storage container for taking up and temporarily storing excess amounts of optical fiber.

2. Description of the Prior Art

The telecommunications industry is rapidly proceeding with the development and installation of optical fiber transmission systems. An optical fiber network requires numerous techniques for managing and connecting a large number of optical fibers.

In the management of optical fibers, it is necessary from time to time to provide slack or excess amounts of optical fiber cable lengths. In order that optical fiber network systems are neatly arranged and manageable, the excess amounts must be stored in a neat and orderly manner for facilitating ease of use of the network apparatus.

Devices for storing excess amounts of optical fiber cables are known in the art. For example, commonly assigned U.S. Pat. No. 4,792,203 to Nelson et al. issued Dec. 20, 1988 teaches an optical fiber distribution apparatus which includes a spool for holding excess fiber from a trunk cable. Similarly, U.S. Pat. No. 4,798,432 to Becker et al. dated Jan. 17, 1989 teaches a storage container for a section of an optical fiber.

Notwithstanding advances made in the art, there is a continuing need for improvement in optical fiber storage apparatus. One disadvantage of the prior art apparatus is illustrated in the aforesaid U.S. Pat. No. 4,792,203. In that apparatus, only multiples of predetermined fixed lengths of excess fiber can be stored on the spool. Namely, any complete winding requires approximately the same amount of excess fiber as any prior winding around the spool. Accordingly, the spool does not accommodate a wide variety of excess cable lengths.

In U.S. Pat. No. 4,798,432, the loading is difficult requiring use of a pincers (see FIG. 46, item 16 of U.S. Pat. No. 4,798,432). Also, and perhaps more importantly, U.S. Pat. No. 4,798,432 is not conveniently used with fiber optic patch cords terminating at attached connectors. In the aforesaid patent, the hole through which the fiber is to be fed is too small to accommodate a connector. If the part were made larger to accommodate a connector, the storage density of the system would be reduced to an impractical level.

It is an object of the present invention to provide an improved storage container for fiber optics telecommunication systems with enhanced performance while maintaining low manufacturing costs.

SUMMARY OF THE INVENTION

According to a preferred embodiment of the present invention a fiber optic storage apparatus is disclosed including a cabinet containing a plurality of trays each slidably received within the cabinet. A take up spool is provided carried on each tray and rotatably mounted thereto for rotation about an axis of rotation. The spool has an outer track exposed through a radial edge of the spool. Further, the spool has an inner track surrounded by the outer track with a pathway connecting the inner track to the outer track. The tray has a pathway exposing an exterior of the tray to the outer track.

DESCRIPTION OF THE PREFERRED EMBODIMENT

Referring now to the several drawing figures in which identical elements are numbered identically throughout, the description of the present invention will now be given with reference to a preferred embodiment.

Figure 1:
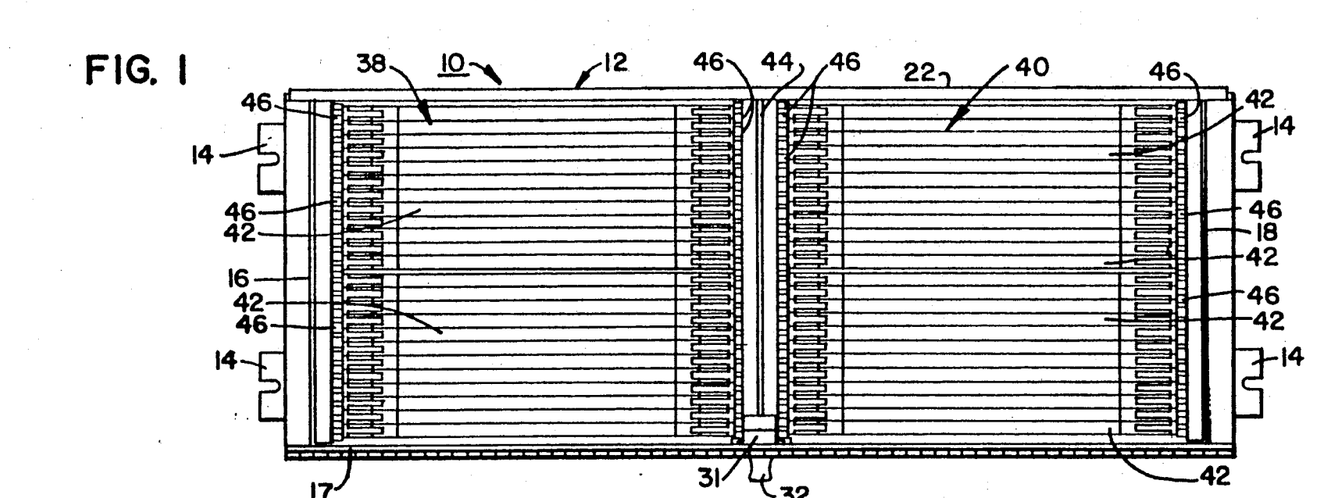
FIG. 1 is a front view taken in elevation of an optical fiber storage cabinet according to the present invention.
Figure 2:
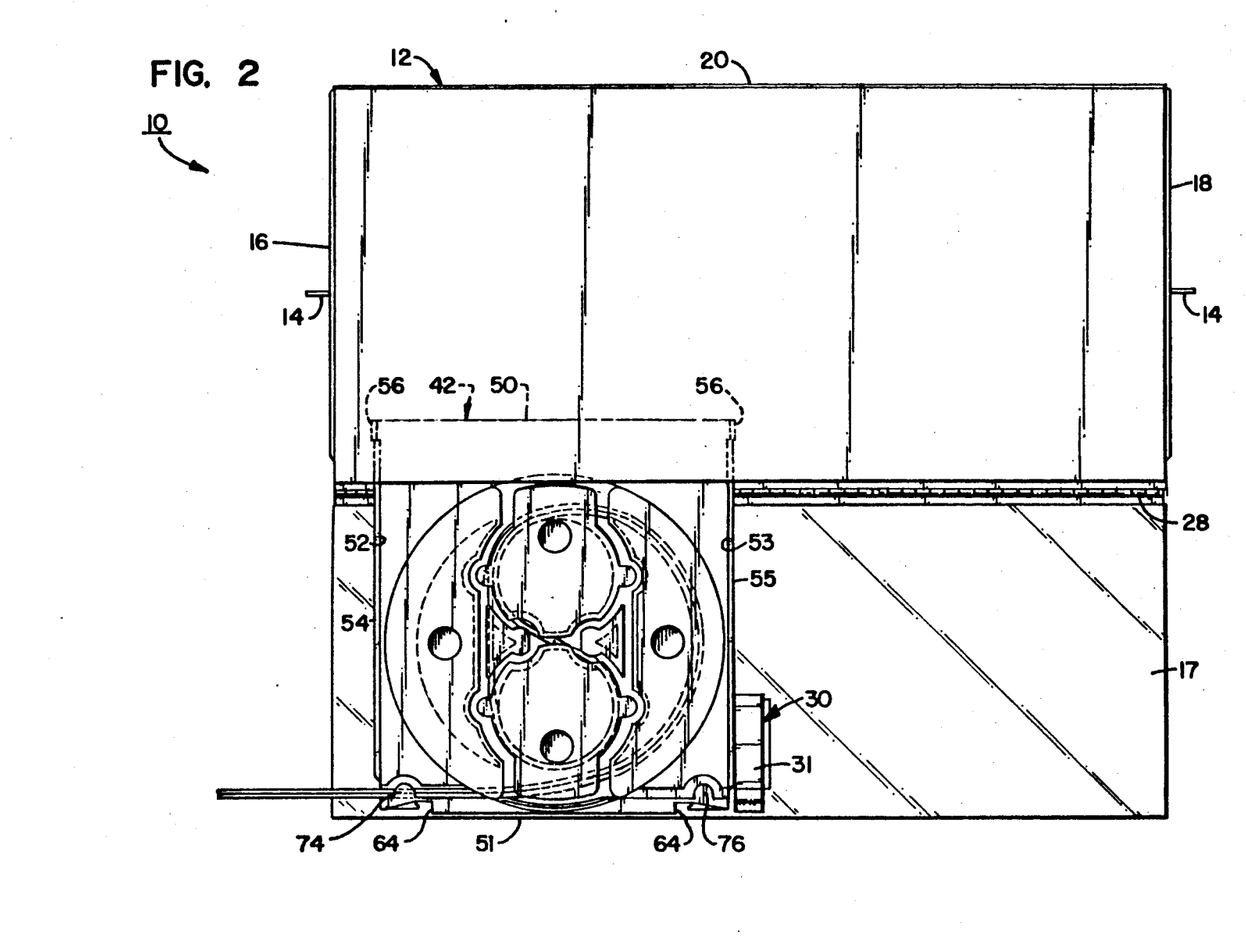
FIG. 2 is top plan view of a cabinet of FIG. 1 with a storage tray and spool in an extended position.
Figure 3:
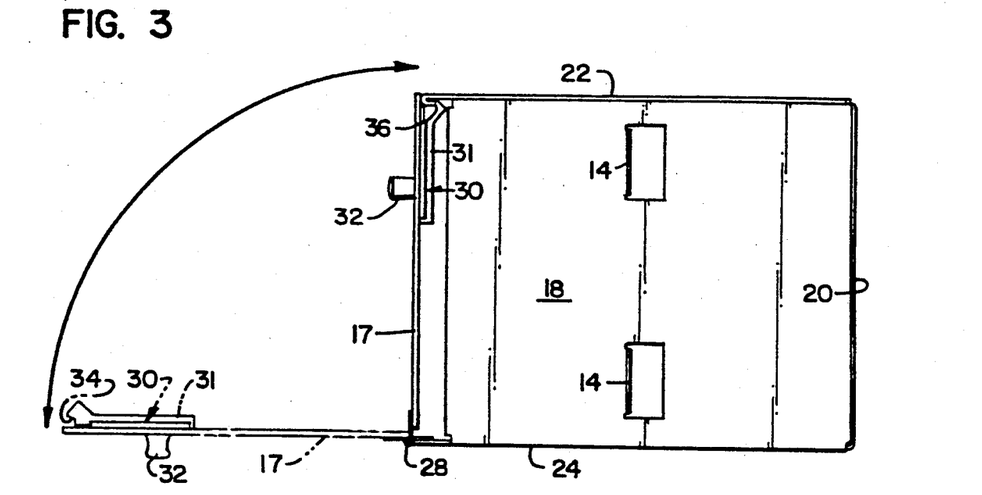
FIG. 3 is a side view taken in elevation of the cabinet of FIG. 1 showing a forward wall in both an up and down position.

Referring now to FIGS. 1-3, the apparatus of the present invention is shown generally at 10 the apparatus includes a box-shaped cabinet 12. The cabinet 12 includes side walls 16, 18, a back wall 20, top and bottom walls 22, 24 and a forward wall 17. Means, such as mounting brackets 14, are provided secured to sidewalls 16, 18 for securing the cabinet 12 to a support structure (not shown).

A lower edge of forward wall 17 is pivotably secured to bottom wall 24 by a hinge member 28. So hinged, forward wall 26 may be pivoted between an up position (shown in solid lines in FIG. 3) and a down position 180° opposite the up position. FIGS. 1 and 2 (and the phantom lines in FIG. 3) show the forward wall 17 in a half-down position displaced 90° from the up position.

A latch 30 is carried on forward wall 17 with an exterior handle 32. Latch 30 releasably secures the forward wall 26 in the up position as shown in FIG. 3. Latch 30 is commer ially available and is preferably slidable latch plate 31 having a ridge 34 which opposes an inwardly turned portion 36 of top wall 22. This opposition holds wall 26 in the up position. Latch plate 31 maybe moved downwardly (in the view of FIG. 3) against the urging of an internal spring (not shown) to slide the ridge 34 away from portion 36 so that wall 26 may be pivoted downwardly to the position shown in phantom lines in FIG. 3.

Disposed within cabinet 12 are two vertical columns 38 and 40 of optical fiber storage trays 42 as shown.

Each column includes twenty-four identical trays. However, this number may vary to be more or less than that shown at the convenience of a user of the invention. Each of the trays 42 is identical and is slidably mounted within the cabinet 12. It will be appreciated that the particular combination and arrangement of trays 42 as shown in the drawings is only one preferred embodiment. The trays 42 can be used in a variety of mounting positions (e.g., single vertical column, horizontal row, etc.)

Figure 11:
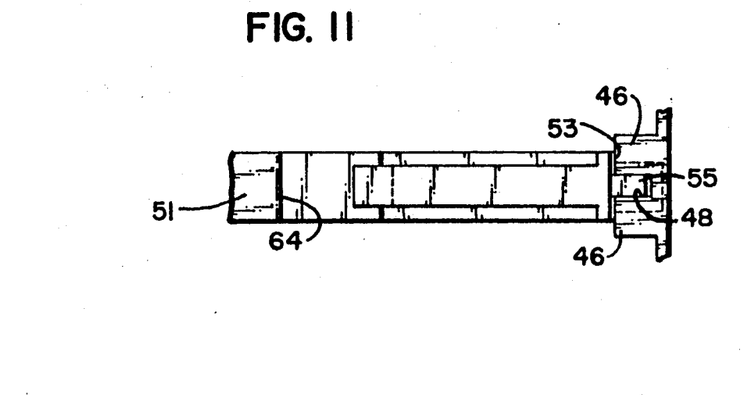
FIG. 11 is an enlarged view of a right hand side of a forward edge of a tray of the present invention showing the tray slidably installed within the cabinet of FIG. 1.
Figure 12:
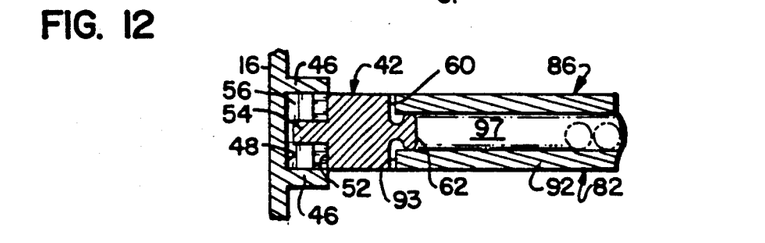
FIG. 12 is a view taken along lines XII—XII of FIG. 4.

As shown in FIG. 1, the cabinet includes a central vertical wall 44. Opposing surfaces of central wall 44 and side walls 16 and 18 include a plurality of parallel aligned spacer ridges 46 (shown enlarged in FIGS. 11 and 12). Opposing surfaces of the spacer ridges 46 define a plurality of parallel aligned horizontal grooves 48 (see FIGS. 11 and 12) disposed in opposing pairs on opposite sides of central wall 44.

Figure 5:
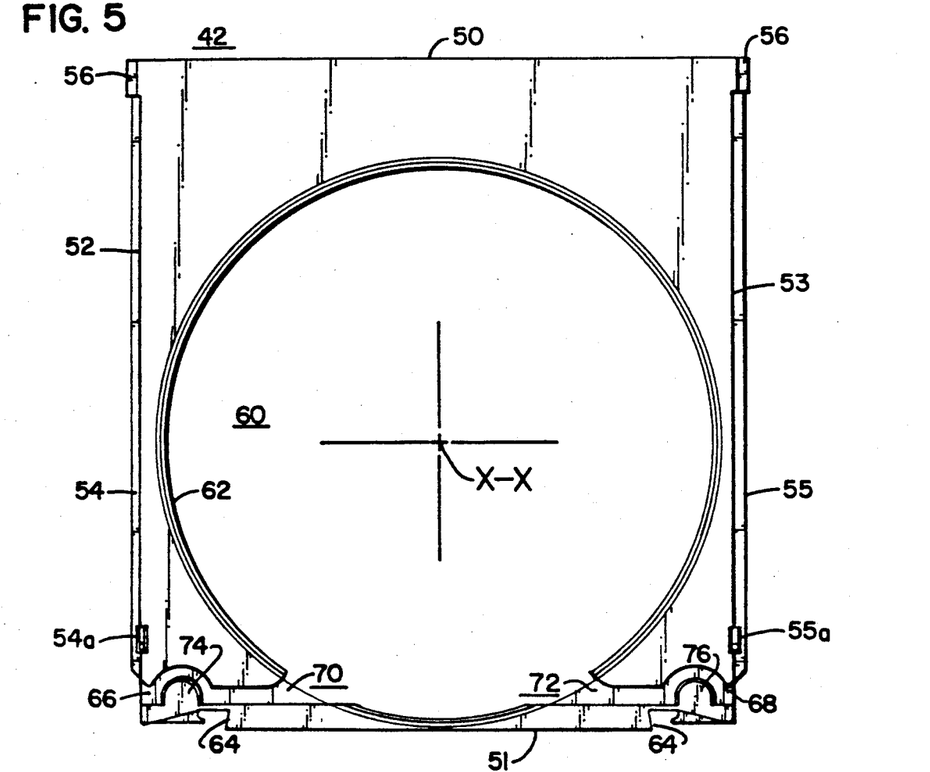
FIG. 5 is a top plan view of a storage tray according to the present invention.

Each of trays 42 is identical and is best shown in FIG. 5. Tray 42 is generally planar and rectangular in shape and presents a back edge 50 a forward edge 51 and side edges 52, 53. Side edges 52, 53 are provided with centrally extending rails 54, 55. Rails 54, 55 are sized to be received within grooves 48 (see FIGS. 11 and 12). With rails 54, 55 received within grooves 48, each tray 42 is slidably received within cabinet 12.

FIG. 2 shows a tray 42 slidably extended from the cabinet 12. The remaining trays are shown fully received within the cabinet 12. Stops 56 (see FIGS. 2 and 5) are disposed at the intersection of side edges 52, 53 with the back edge 50 so that the tray 42 cannot be inadvertently pulled out of the cabinet 12.

Figure 13:
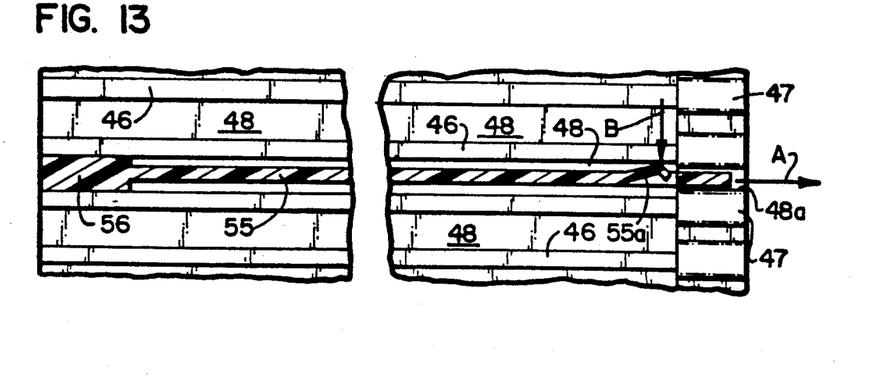
FIG. 13 is a side elevation sectional view showing a traying in a sliding position with the cabinet.

FIG. 13 shows a rail 55 of side edge 53 sliding in wall 44. As can be seen, stop 56 is the bearing surface on which the tray 42 slides. Namely, the stop 56 is slidably received between opposing surfaces of ridges 46. Shown only in FIG. 13, the ends of ridges 46 at the forward wall 17 of the cabinet 12 are provided with raised protrusions 47 which narrow gap 48 to create a narrow gap portion 48a. A detent 55a, 54a is provided on each of rails 55, 54. As shown in FIG. 13, detent 55a opposes raised protrusion 47. Upon urging of the tray 42 in the direction of arrow A, detent 55a flexes downwardly in the direction of arrow B to permit the tray 42 to slide out of the cabinet 12 until the stop 56 abuts the protrusion 47. In this manner, detent 55a prevents undesired sliding of a tray to an extended position.

Each of the trays 42 has a circular opening 60 (see FIG. 5) formed through the tray 42. The circular edge of the tray 42 which defines opening 60 is provided with a flanged rail 62 (see FIGS. 5 and 12).

Figure 4:
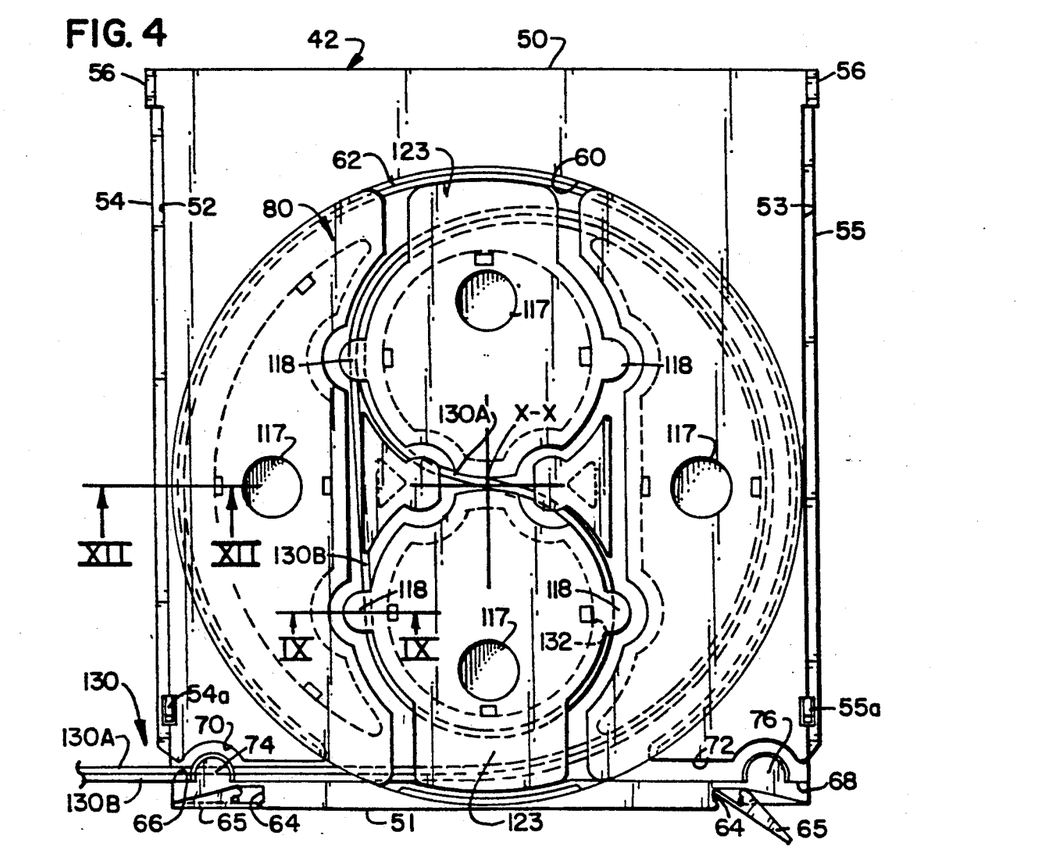
FIG. 4 is a top plan view of a tray and spool according to the present invention.
Figure 10:
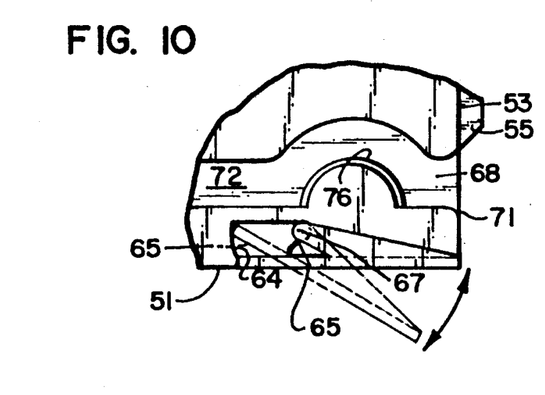
FIG. 10 is an enlarged view of a forward right hand corner of the tray of FIG. 5.

The forward edge 51 of tray 42 is provided with forward facing inserts 64 formed therein sized to receive a pivotable handle 65 connected to tray 42 to pivot point 67. Handle 65 is shown in FIG. 10 in an "in" positions (solid lines) and an "out" position (phantom lines). In FIG. 4, handles 65 are shown "in" (left side of Figure) and "out" (right side of Figure). To draw the tray 42 out of cabinet 12, an operator pushes tab 69 into recess 64 and then grasps handle 65 and pulls tray 42. (For ease of illustration, handles 65 are shown only in FIGS. 4 and 10.)

Adjacent forward edge 51, each of side edges 52, 53 is provided with cable access openings 66, 68, respectively. Shown best in FIG. 10, the openings 66, 68 are provided with a radius 71 to present a curved opening 68. (Not shown, opening 66 has a similar radius).

Opposing surfaces of the tray 42 define a left cable pathway 70 extending from left access opening 66 to circular opening 60. A right cable pathway 72 extends from right access opening 68 to circular opening 60. Retaining clips 74, 76 are provided partially covering passageway 70, 72 so that a cable may be placed within passageway 70, 72 and maintained by clips 74, 76 as will be described.

A disc-shaped spool 80 is provided for each of the trays 42. Spool 80 is circular in shape and is provided with a thickness approximately equal to the thickness of tray 42 and a diameter approximately equal to the diameter of circular opening 60. Spool 80 is mounted on tray 42 for rotation about the central axis X—X of spool 80 which is coincident with the central axis X—X of the circular opening 60.

Figure 7:
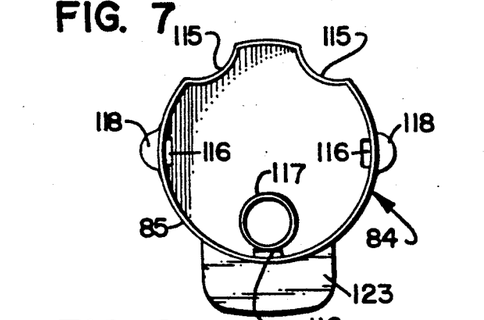
FIG. 7 is a top plan view of a cover for use with the plate of FIG. 6.
Figure 8:
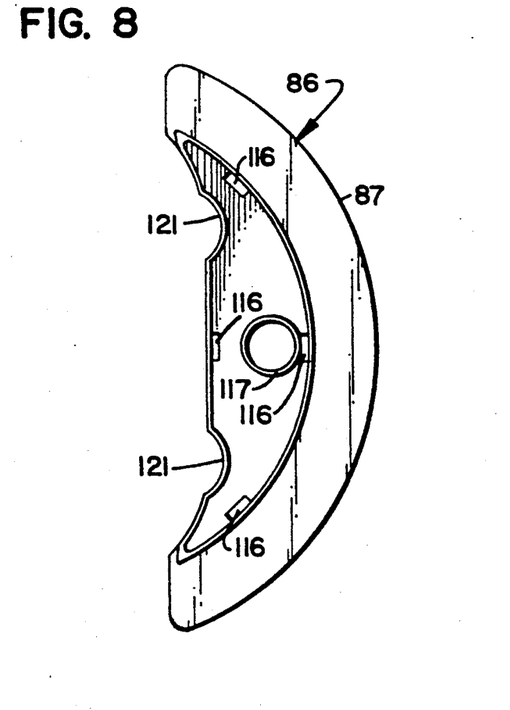
FIG. 8 is a top plan view of a cover for use with a plate of FIG. 6.
Figure 9:
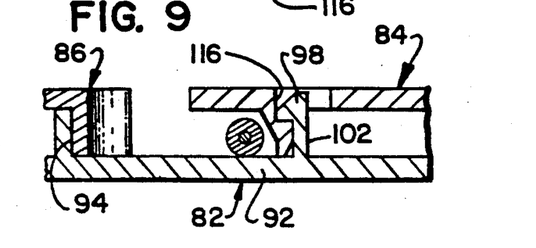
FIG. 9 is a view taken along lines IX—IX of FIG. 4.

Spool 80 includes a body member 82 (shown in FIG. 8) and four spool covers including two generally circular covers 84 (one of which is shown in FIG. 7) and two partially semi-circular covers 86 (one of which is shown in FIG. 8).

Body member 82 includes a circular bottom plate 92. Generally semi-cylindrical columns 94, 95 are provided on surface 92. Each of columns 94, 95 is identical and include arcuate outer surfaces 96 which are the arch of a circle having a center coincident with the center X—X of the disc 92. Surfaces 96 cooperate to define an outer track 97 around which an optical fiber may be wound. Each of generally semi-cylindrical columns 94, 95 carries four retaining clips 98. Clips 98 are identical and have a function which will become apparent. Surfaces 96 are spaced from an outer edge 93 of plate 92 by distance sized to receive a predetermined multiple of optical fiber cables in side-by-side relation (see FIG. 12).

Figure 6:
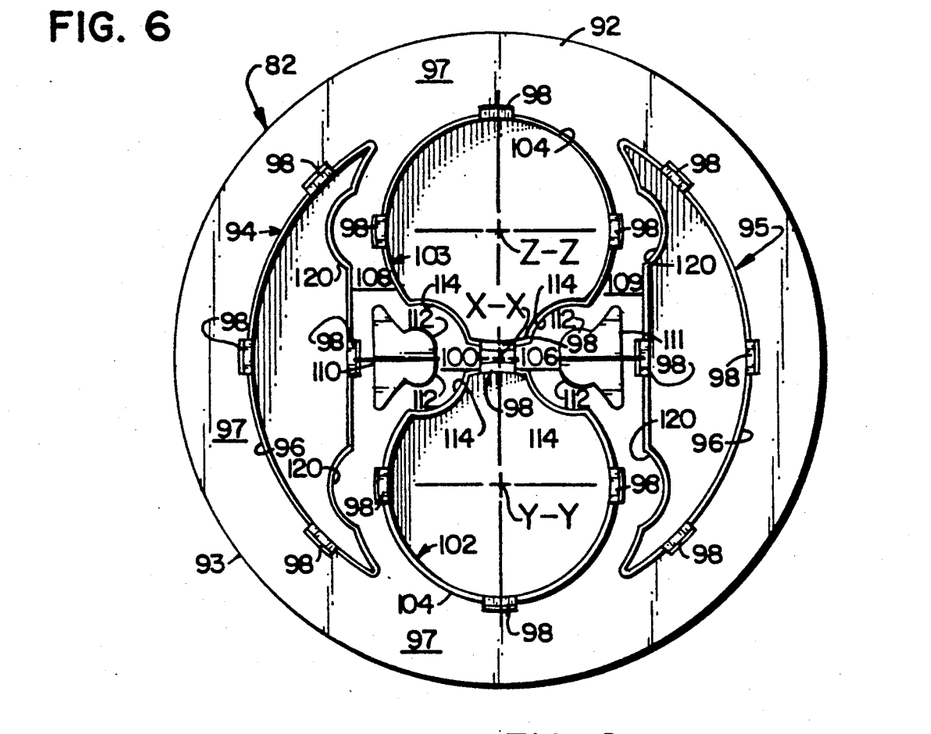
FIG. 6 is a top plan view of a base of a storage spool according to the present invention.

Columns 94 are spaced apart to define an interior volume 100 (see FIG. 6) disposed within the outer track 97 defined by surfaces 96. Within interior 100 are located two generally cylindrical columns 102, 103 each having four retaining clips 98. Columns 102, 103 are identical and include generally cylindrical outer surfaces 104 disposed within the outer track 97 defined by surfaces 96. Columns 102, 103 have central axis Y—Y and Z—Z which are spaced from each other and in colinear and space relation from the central axis X—X of disk 92. Further, each of the cylindrical columns 102, 103 are spaced apart from one another to define an inter-column pathway 106 therebetween.

Opposing surfaces of the cylindrical columns 102, 103 and generally semi-cylindrical columns 94, 95 define a pair of generally parallel cable pathways 108, 109 on opposite sides of cylindrical columns 102, 103. Parallel cable pathways 108, 109 are in communication with the outer track 97 and are centrally joined by inter-column pathway 106. Disposed within each of parallel cable pathways 108, 109 are separating posts 110, 111 which are generally triangular in configuration and have tabs 112 partially covering pathway 106. Opposing tabs 112, each of cylindrical columns 102, 103 is provided with recess 114.

Columns 102, 103 are selected such that the radius of exterior surfaces 104 are such that an optical fiber can be wound around the radius of the surfaces 104 without damage to the fiber or the signal being carried by the fiber. Controlling radii of curvature and bending of an optical fiber to prevent such adverse consequences is known in the art.

Each of covers 84, 86 includes slots 116 sized to receive clips 98 in a manner with clips 98 fastening the covers 84, 86 to semi-cylindrical columns 94, 95 or cylindrical columns 102, 103, respectfully. Also, each cover 84, 86 includes holes 117 sized to receive a human finger. By inserting a finger within any of holes 117, an operator can rotate the spool 80 within tray 42.

The covers 84, 86 are proportionately similar to the shapes of columns 94, 95 and 102, 103 except that the covers 84, 86 are enlarged such that their peripheral edges 85, 87 extend over the exterior edges of columns 94, 95 and 102, 103 and thereby cover passage ways 108, 106 and pathway 95. Tabs 118 extend beyond each of the covers 84 and partially over pathways 108, 109 with a portion of semi-cylindrical columns 94, 95 and covers 86 recessed away at 120, 121 to accommodate the tabs. Cylindrical covers 84 include recesses 115 to accommodate tabs 112 on posts 110. Cylindrical covers 84 also include enlarged tabs 123 sized to extend over outer track 97. The purpose and functions of the tabs and the recess will be described.

The cover 86 cooperates with the plate 92 to capture the spool 82 on the rail 62. Namely, the rail 62 is received between the opposing surfaces of the disk 92 and the covers (see FIG. 12). As a result, the spool 82 is now freely rotatable within the tray 42 about axis X—X.

In operation, excess fiber optic cable to be stored may be received from either the left or right hand side of the cabinet (when viewed in FIG. 1). The cables are provided looped so that a single cable 130 (see FIG. 4) ends at a loop portion 132 with the cable extending from the loop portion 132 in side-by-side segments 130A and 130B.

For trays in the left column 38 (such as tray 42 in FIG. 2) the loop 132 is placed surrounding a cylindrical column (such as column 102) with one segment 130A entrained through passageway 106 and into lateral passage 108 between post 110 and column 103. The other segment 130B of the cable 130 extends directly into 108, passes between post 110 and semi-cylindrical column 94 and abuts segment 130A in side-by-side relation. The now side-by-side segments 130A, 130B are disposed within the outer track 97.

The excess cable 130 can be taken up simply by rotation of the spool in the counter clockwise direction (when viewed in FIG. 4). To remove the cable, the cable 130 is simply pulled by an operator with the spool rotating in the clockwise direction (when viewed in FIG. 4).

The spacing between the covers 84, 86 provide openings through the axial face of the spool through which cable 130 can be inserted into pathways 97, 106, 108, 109. The tabs 112, 118 retain a cable in the pathways. The tray pathway 70 is exposed for the same purpose with tab 74 holding a cable in pathway 70.

The axial dimension of the circumferential track 97 is preferably selected to be equal to the diameter of a cable 130. If multiple cables are desired to be placed within a track, the track 97 thickness would be correspondently increased. The radial dimension of the track 97 is selected so that multiple rotations of the spool 80 can be provided so that the cable 130 can be progressively laid in side-by-side relation as the cable 130 is taken up through counter-clockwise rotation of the spool. Accordingly, any desired length of cable can be taken up. This is a significant advantage over the prior art such as that shown in U.S. Pat. No. 4,792,203 where discrete amounts of cable had to be taken up.

The foregoing descriptive of operation was given with respect to a tray 42 and spool 82 in the left column 38 of cabinet 12. For cables in the right hand column 40, the cable is simply inserted through the right opening 68 of the tray 42 and the direction of rotation of the spool is reversed in order to take up or remove cable.

From the foregoing detailed description of the invention, it has been shown how the object of the invention has been obtained in a preferred manner. However, modifications and equivalents of the disclosed concepts are intended to be included within the scope of the invention. Thus, the invention is limited only by the scope of the claims which are attached or appended hereto.

What is claimed is:

1. An optical fiber storage apparatus comprising:
   a first member and a second member rotatably received on said first member to rotate relative to said first member complete about an axis of rotation;
   said second member having means for defining an outer circumferential track sized to receive an optical fiber within said outer track and wound around said outer track;
   affixing means disposed on an interior of said outer track for releasably affixing an optical fiber to said second member for rotation therewith;
   surfaces of said second member defining a cable pathway connecting said interior to said outer track;
   said first member having means defining a pathway connecting an exterior of said apparatus to said outer track; and
   said affixing means including means for positioning said fiber with said fiber having first and second portions each extending in a similar radial direction from said interior to said outer track.

2. An optical fiber storage apparatus comprising;
   a tray;
   a take-up spool carried on said tray and rotatably mounted thereto for rotation relative to said tray completely about an axis of rotation;
   said spool having first track defining means for defining an outer track exposed through a radial edge of said spool;
   said spool having second track defining means for defining an inner track disposed surrounding by said outer track and selected to releasable receive a loop end of a fiber cable with said fiber having first and second portions disposed in generally side-by-side relation;
   said spool having means for defining a cable pathway connecting said fiber track and said outer track with said pathway disposed to pass said portions from said inner track to said outer track and with said portions extending in similar radial direction.

3. An apparatus according to claim 2 wherein said spool includes first members having radial circumferential surfaces defining said outer track with said first members spaced apart to define a spool interior;
   second members disposed within said interior and defining a track disposed within said interior in communication with said exterior track;
   axial openings formed through said member defining axial pathways for inserting a cable within said interior track and directing said cable to said exterior track.

4. An apparatus according to claim 2 wherein said spool includes a bottom plate and an upper plate separated by a plurality of columns;
   said plurality of columns including outer first columns having exterior radial surfaces defining an outer track surrounding said spool and exposed through a radial edge of said spool, said first columns spaced apart to define a spool interior;
   inner second columns disposed within said interior to define a cable pathway within said interior surrounding at least one of said second columns and exposed through said interior to said outer pathway;
   axial openings formed through at least one face of said disk with said axial openings accommodating insertion and removal of a cable into said interior pathways and surrounding said at least one second column.

5. An apparatus according to claim 4 wherein said tray includes a generally circular opening having opening defining edges provided with an annular rail, said annular rail captured between opposing surfaces of said bottom and upper plates.

6. An apparatus according to claim 2 wherein said tray includes cable access openings connected through pathways formed in said tray in communication with said outer circumferential opening and said tray having axial openings exposing said pathways.

* * * * *

UNITED STATES PATENT AND TRADEMARK OFFICE
CERTIFICATE OF CORRECTION

PATENT NO. : 5,013,121

DATED : May 7, 1991

INVENTOR(S) : Mark A. Anton et al.

It is certified that error appears in the above-identified patent and that said Letters Patent is hereby corrected as shown below:

Col. 6, line 48, "releasable" should read --releasably--.

Col. 6, line 53, "fiber" should read --inner--.

Signed and Sealed this

Twenty-ninth Day of December, 1992

Attest:

DOUGLAS B. COMER

*Attesting Officer*　　　*Acting Commissioner of Patents and Trademarks*